Oct. 3, 1967     A. D. MATTIA ET AL     3,344,604
APPARATUS FOR SELECTIVELY REVERSING THE THRUST
OF FRONT FAN JET ENGINES
Filed Dec. 14, 1965     3 Sheets-Sheet 1

INVENTORS
ARMAND D. MATTIA
ROBERT C. HARBISON
BY

AGENT

INVENTORS
ARMAND D. MATTIA
ROBERT C. HARBISON

AGENT

Oct. 3, 1967     A. D. MATTIA ET AL     3,344,604
APPARATUS FOR SELECTIVELY REVERSING THE THRUST
OF FRONT FAN JET ENGINES
Filed Dec. 14, 1965     3 Sheets-Sheet 3

INVENTORS
ARMAND D. MATTIA
ROBERT C. HARBISON
BY

AGENT

United States Patent Office 3,344,604
Patented Oct. 3, 1967

3,344,604
APPARATUS FOR SELECTIVELY REVERSING THE THRUST OF FRONT FAN JET ENGINES
Armand D. Mattia, La Mesa, and Robert C. Harbison, San Diego, Calif., assignors to General Dynamics Corporation, San Diego, Calif., a corporation of Delaware
Filed Dec. 14, 1965, Ser. No. 513,809
10 Claims. (Cl. 60—229)

ABSTRACT OF THE DISCLOSURE

A thrust reverser for use in the path of airflow directly aft of the front fan portion of a jet engine. Blocker vanes normally disposed parallel to the fan-output airflow are actuated by linkages connecting them to a powered actuator ring to a position at right angles to the airflow diverting the airflow upwards and through opened cascade vanes. The cascade vanes are opened either by linkage to the blocker vanes or by spring action.

---

The application of thrust reversers to aircraft jet engines in the exhaust forward fan duct section is of relatively recent date; and therefore, the development in this field which is of the greatest importance in the operation of high speed aircraft is still wide open for improvement.

Jet engines, such as the turbo fan engines used in airplanes, are equipped with a thrust reverser unit that is positioned directly after the front fan exhaust portion. Approximately eighty five percent (85%) of the thrust is developed by the front fan exhaust duct; and therefore, a thrust reverser unit at the far end part of the engine is not required or profitable.

During landing the reverse thrust accomplishes speed reduction in the aircraft. Because of the higher speed developed in the newer airplanes, the means for reducing the speed during flight by flaps and other types of speed brakes are not sufficient; and therefore, by combining a partial reverse thrust together with the existing braking means, a sufficient and effective speed reduction can be obtained.

It is the general object of this invention to provide a fail-safe designed mechanism employing small operating forces for accomplishment of the system.

It is a further object of the present invention to provide a thrust reverser with a high degree of reliability by its design simplicity, its few operating parts, and ease of maintenance and installation.

It is another object of the present invention to provide a thrust reverser which operates from forward to reverse thrust in less than one second.

It is a very important object of this invention to provide a thrust reverser which employs a force balance pressure system which can be operated in flight and under fan power.

In general, the present thrust reverser for jet engines comprises a plurality of blocker vanes rotationally mounted in the aft portion of the front fan exhaust duct. An activating ring member is slidably mounted within said engine and connected with associated power means for sliding action. Linkage means are connected between the ring member and the blocker vanes so that the sliding action of the ring member will transmit movement via the linkage means for rotation of the blocker vanes and thus cause closure or opening of the front fan exhaust duct. A plurality of cascade means having movable foils are located adjacent the blocker vanes and are hingeably mounted and capable of cooperating with the blocker vanes so that when the blocker vanes are closed the cascade means foils will open outwardly radially with respect to the engine providing a guided reversed deflection of the air stream and thus achieve a reverse thrust.

For a better understanding of the invention reference should be made to the accompanying drawings, wherein:

FIGURE 6 illustrates an alternative cascade actuation means.

Figure 1:
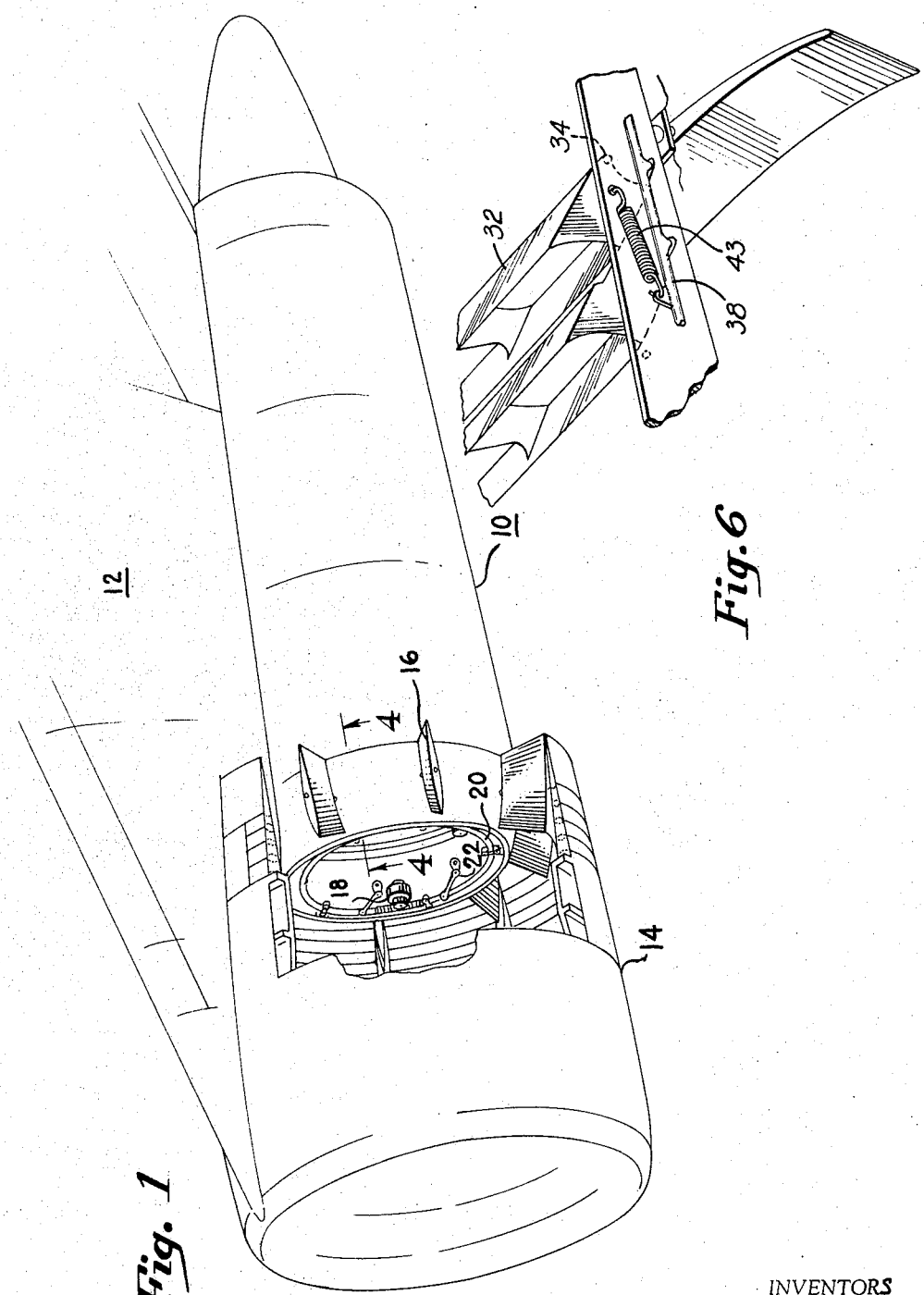
FIGURE 1 is a perspective side view of a jet engine provided with a cutout section showing the thrust reverser in its inactivated position.

Referring now to the drawings, wherein like reference characters designate corresponding parts in the several views, there is shown in FIGURE 1 a perspective view of a jet engine 10 mounted by a strut 12 to the wings of an airplane (not shown). The forward section of the jet engine is illustrated with a cutaway section in order to show the thrust reverser mechanism. The fan exhaust duct 14 is provided in its aft section with a series of eight (8) streamlined blocker vanes 16. The blocker vanes 16 are positioned parallel to the direction of air flow except when reverser thrust is desired. A pair of rotary actuators 18 are mounted inside of the engine and connected to an actuation ring 20. Linkage means 22 are pivotally mounted and arranged for transmitting movement provided by said actuators 18 to said blocker vanes 16.

Figure 2:
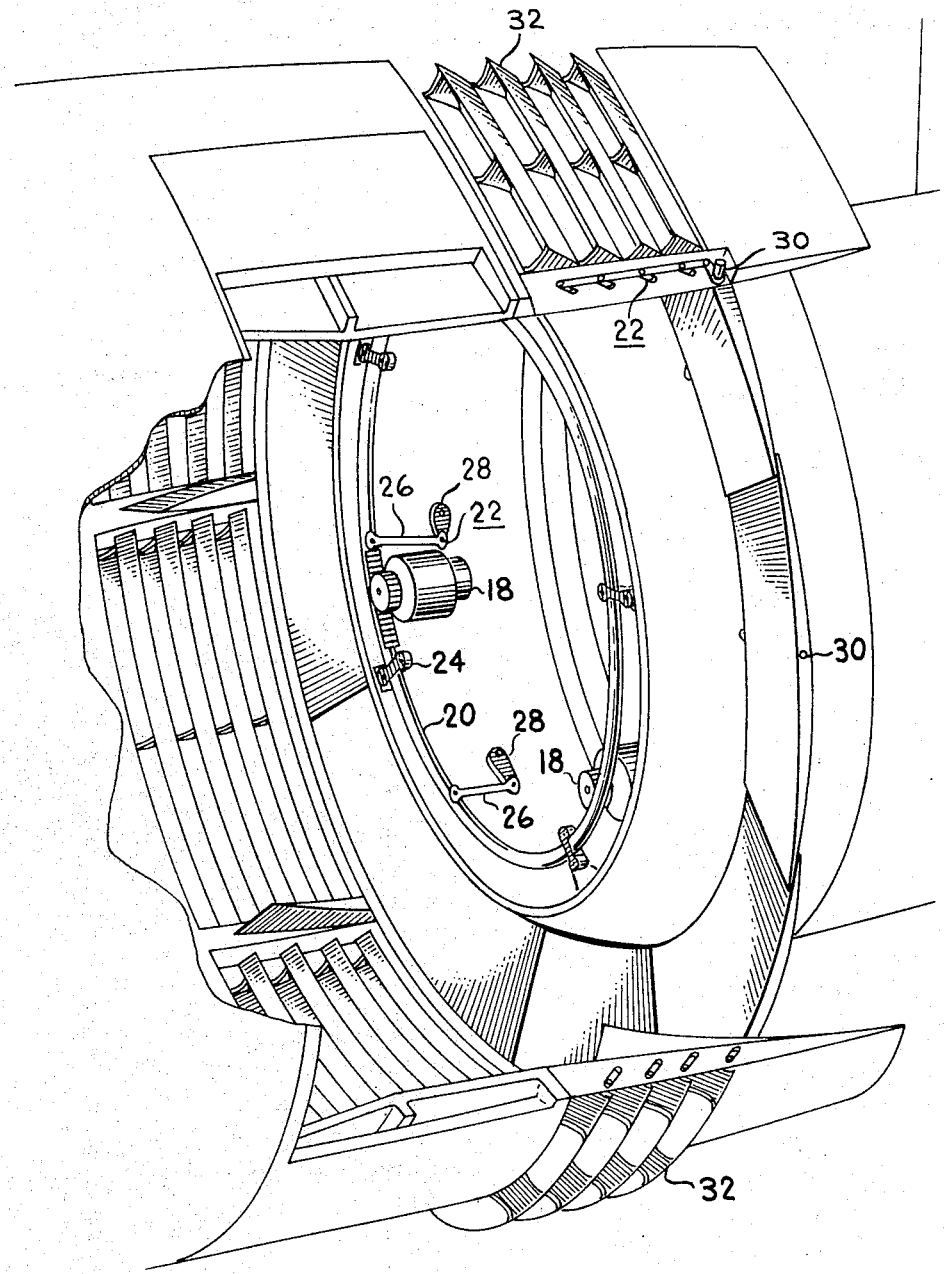
FIGURE 2 shows isometrically on an enlarged scale the thrust reverser in its activated position.

Referring now to FIGURE 2 there is illustrated in enlarged fashion the thrust reverser mechanism in the thrust reversing position. Actuation ring 20 is slidably mounted on roller means 24. At various points about the periphery of actuation ring 20 there is pivotally mounted a plurality of linkage members 26. The linkages 26 are pivotally mounted to first arm lever members 28 which are mounted to a torque shaft 30 of the blocker vane 16. The cascade means 32 are illustrated with their foils in the open or reverse thrust position.

Figure 3:
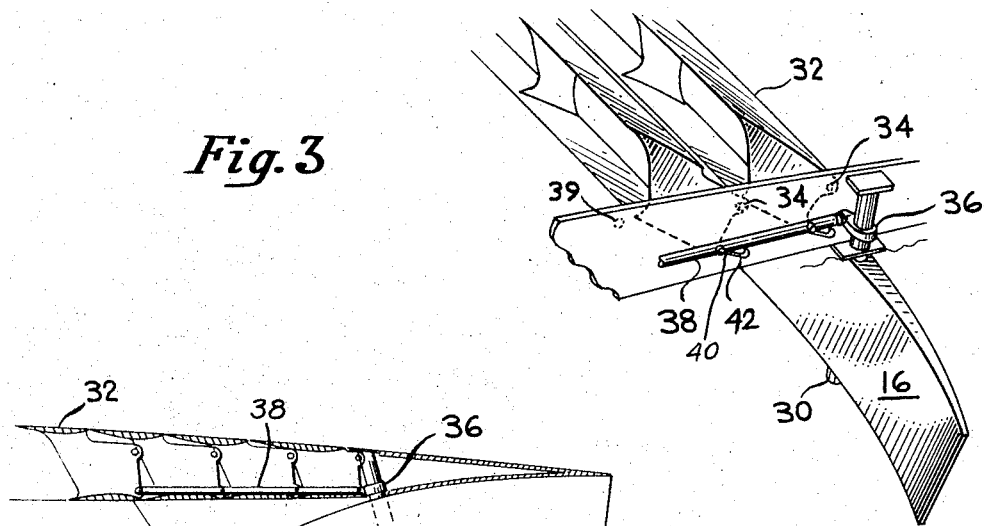
FIGURE 3 illustrates the two main features of the thrust reverser: the blocker vane and the cascade means. The mechanism is shown in the reversed thrust position.

Referring now to FIGURE 3 there is shown the cascade means 32 hinged open along hinge points 34. This reverse thrust position as shown in FIGURE 3 of the cascade means 32 is accomplished by the rotation of the torque shaft 30, through cooperating linkages. A second arm lever means 36 is mounted to the torque shaft 30 which when rotated will move a rod 38 pivotally mounted to the arm lever means 36 and provided with sliding pivot means 40 for connection to cascade means 32. The sliding pivot means 40 are capable of sliding in slots 42, as illustrated.

Figure 4:
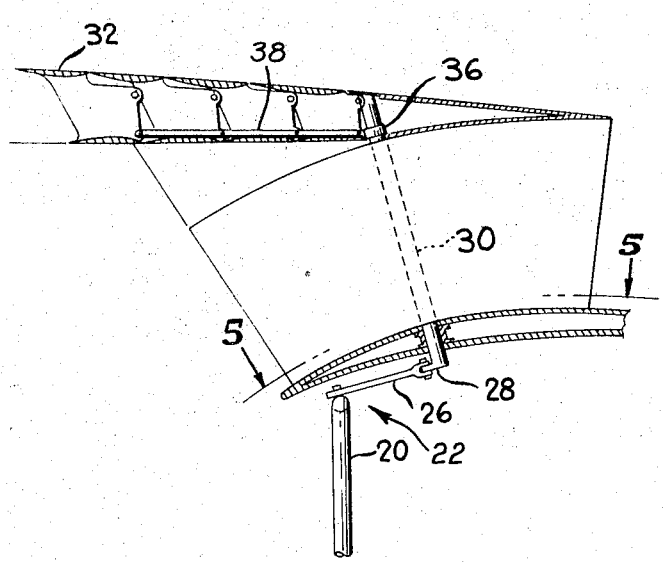
FIGURE 4 illustrates a section view of the cascade means and blocker fan in the forward thrust position and taken from FIGURE 1, line 4—4.

In FIGURE 4 the cascade means 32 are closed and the blocker vane 16 is parallel with respect to the air flow. This view shows the linkage means 22 which comprises the actuation ring 20 with its pivot connection for linkage 26 which is pivotally connected to first arm lever 28 which in turn is mounted to the torque shaft 30. The torque shaft 30 is connected to the rod 38 via the second arm lever 36 mounted on the torque shaft 30. The cascade means 32 are in a closed position and, as illustrated in FIGURE 4, its periphery follows the inner and outer contour line of the fan duct.

Figure 5:
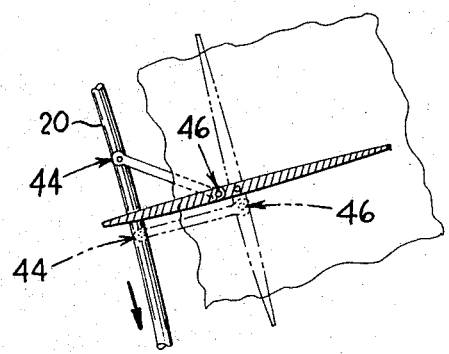
FIGURE 5 illustrates a plan view taken along line 5—5 from FIGURE 4, and shows the reverse thrust position in phantom line fashion.

FIGURE 5 is a plan view taken along line 5—5 from FIGURE 4, and shows the open position (solid lines) and closed position (phantom lines) of the blocker vane 16 and in particular the displacement of rotation pivot point 44 in the open and closed position of the blocker vane 16 caused by the rotation of the actuation ring 20. Also the arc of rotation accomplished by the pivot point 46 of arm lever means 28 is shown.

FIGURE 6 is a view similar to that of FIGURE 3 but showing the alternative spring cascade actuation mechanism. The springs may be mounted directly to individual cascades 32 or a group of cascades operated by a single spring 43 as shown. Spring 43 maintains tension on rod 38 to normally hold the cascades in the closed position. Operation of the blocker vanes, however, increases the internal pressure in the fan duct overcoming the spring tension and forcing the cascades to the open position shown.

Having thus described the several figures by reference characters, the operation of the thrust reverser mechanism is as follows:

Assuming that no thrust reversal of the air flow is required, the thrust reversal mechanism is in an inactivated or open position and the cascade means 36 and blocker vanes 16 are positioned as illustrated in FIGURE 1. The blocker vanes 16 are streamlined and aligned parallel to the direction of air flow thus providing a minimum of opposition.

Upon the requirement for reverse thrust, the rotary actuators 18 are energized to rotate the actuation ring 20, which is slidably positioned and mounted by roller means 24 for a short distance of approximately six and one half inches (6½). This relatively small movement is sufficient to pivot the blocker vanes 16 which are attached to the actuation ring 20 by means of the linkages 26 and arm lever 28 through an arc of ninety degrees (90°) and thereby blocking the fan exhaust duct 14. This position is accomplished and shown in the illustration of FIGURE 2. By the movement of the blocker vane 16 the cascade means are simultaneously moved through an interconnecting linkage means 22. As shown in FIGURES 2, 3, and 4, the torque shaft 30 extends beyond the top part of the blocker vane 16. The extended portion is mounted on a second arm lever means 36 which connects pivotally to rod 38. Rotation of the torque shaft 30 does accomplish a linear motion of the rod 38 thereby causing the opening of the cascade means along hinge points 34. Thus the same motion which turns the blocker vanes 16 ninety degrees (90°) supplies movement to the cascades means 32 through an approximate arc of forty-five degrees (45°). The cascade means 32 air foils follow in the retracted position the inner and outer contour line of the fan duct 14. However, in the extended or reversed thrust position the cascade means air foils are positioned for directing the fan exhaust outward and forward and thereby effect the required reversed thrust.

It should also be understood that the angle of the cascade deflection in either method of operation can be varied by means of adjustable stops located between the cascade assemblies, so that partial reversed thrust of various percentages could be obtained.

Although many minor structural modifications might be suggested to the preferred embodiment herein described by way of illustrative example only, it should be understood that many changes could be effected to exemplary structures herein described without departing from the spirit of the present invention and accordingly, it should be further understood that the inventors wished to enclose within the scope of the patent warranted hereon all such modifications are reasonably and properly come within the scape of the inventors' contribution to the art.

We claim:

1. A thrust reverser for engines with bypass fan exhaust ducts comprising in combination:

(a) a plurality of blocker vanes radially positioned and pivotally mounted in said engine fan exhaust duct,
(b) an actuation member movably mounted in said engine,
(c) actuation means connected to said actuation member for movement thereof,
(d) linkage means pivotally connecting said actuation member with said blocker vanes, and
(e) air deflecting foil means pivotally and radially mounted about said fan exhaust duct and next to said blocker vanes and cooperating with said blocker vanes to effect movement.

2. A thrust reverser mechanism for turbo fan bypass engines with a fan exhaust duct disposed about the engine compressor cowl, comprising in combination:

(a) a plurality of blocker vanes pivotally mounted in radial arrangement in said fan exhaust duct,
(b) an actuating member movably mounted adjacent with said engine compressor cowl,
(c) linkage means pivotally connecting said actuating member with said blocker vanes,
(d) said actuating member connected with associated actuating means for inducing motion to said actuating member, and
(e) means having a plurality of air deflecting foils, pivotally and radially mounted in and about said fan exhaust duct and cooperating with said blockage vanes so that movement of said blockage vanes induces movement of said deflecting foils.

3. A thrust reverser mechanism for turbo fan bypass engines with a fan exhaust duct disposed about the engine compressor cowl, comprising in combination:

(a) a plurality of blocker vanes pivotally mounted in said fan exhaust duct on radially positioned pivot points for accomplishing closure and opening of said fan exhaust duct,
(b) an acutation ring member movably mounted on said engine adjacent said radially positioned pivot points,
(c) linkage means pivotally connecting said blocker vanes with said actuation ring member for transmitting movement from said ring member to said blocker vanes,
(d) said ring member connected with associated actuating means for inducing rotating motion to said ring member, and
(e) cascade means having a plurality of air deflecting foils, pivotally and radially mounted in and about said fan exhaust duct and cooperating with said blocker vanes so that movement of said blocker vanes induces movement of said cascade means deflecting foils.

4. A thrust reverser as claimed in claim 3 wherein said cascade means are provided with spring biased means for maintaining said foils in closed position during forward thrust and wherein closure of said fan exhaust duct during reverse thrust requirements, by said blocker vanes, causes opening of said pivotally mounted deflecting foils by air pressure increase overcoming said spring bias means tension.

5. A thrust reverse as claimed in claim 3 wherein said cascade means are provided with pivotally connected rod means for actuating said deflection foils and arm means connecting said rod means with said blocker vanes so that closure of said fan exhaust duct caused by rotation of said blocker vanes along said pivot points activates said arm means and displaces said rod means thereby opening said cascade means deflecting foils during reverse thrust requirements.

6. A thrust reverse mechanism for turbo fan bypass engines with a fan exhaust duct disposed about the engine compressor cowl, comprising in combination:

(a) a plurality of blocker vanes rotationally mounted, in radial arrangement, in said fan exhaust duct, along a radial axis between said compressor cowl on one side and said fan exhaust duct on the other side, each said axis dividing said blocker vanes into unequal surface areas, (b) a substantially ring-shaped actuation member rotatably mounted adjacent with and substantially concentric to said engine, (c) linkage means comprising a linkage arm and a lever arm, pivotally connecting said ring member with said blocker vanes, (d) associated actuation means connected with said ring member for inducing rotating motion to said ring member, and (e) a plurality of air deflecting foils arranged in cascade fashion and pivotally mounted in radial arrangement in and about said fan exhaust duct, before said blocker vanes, with means for cooperation with said blocker vanes so that movement of said blocker vanes induces movement of said cascade means deflecting foils.

7. A thrust reverser mechanism for turbo fan bypass engines with fan exhaust duct means radially disposed about the engine compressor cowl comprising in combination:

(a) a plurality of deflecting foil means mounted in radial arrangement about said fan exhaust periphery, (b) said foil means capable of pivoting from a closed position in alignment with said fan exhaust periphery to an open location whereby said foil means deflect inside engine air pressure in a reversed thrust direction, (c) a plurality of blocker vanes radially arranged in said fan exhaust duct, aft of said foil means, along an axis for rotation between said fan exhaust periphery and said engine cowl so that said vanes can be rotated from a closed position which opposes forward thrust from said fan exhaust duct to an open position whereby said vanes are parallel positioned with regard to forward thrust air, (d) an actuator ring member substantially concentrically and rotationally mounted on said engine cowl, (e) first linkage means pivotally connecting said ring member with each of said vanes individually, (f) a second linkage means pivotally connecting said foil means with each of said vane means individually, and (g) associated actuator means connected with said ring member for inducing rotation to said ring member whereby said linkage means actuates said blocker vanes to rotate along said axis and whereby said axis rotation induces motion to said foil means via said second linkage means and whereby said motion of said vane means and said foil means are simultaneously arranged so that a closed position of the blocker vane creates an open reverse thrust position of said foil means and vice versa for forward thrust.

8. A turbo fan thrust reverser mechanism for turbo fan bypass engines with fan exhaust duct radially disposed about the engine compressor cowl, comprising in combination:

(a) a plurality of cascade means, each having a plurality of pivotally tandem-arranged mounted deflection foils, radially positioned in and about said fan exhaust duct, (b) said foils of each said cascade means pivotally connected with a rod for pivoting said foils from a closed position in alignment with said fan exhaust periphery to an open position whereby said foils deflect inside air pressure in a reverse thrust direction outward of said fan exhaust duct, (c) a plurality of blocker vanes radially arranged in said fan exhaust duct, aft of said cascade means, along an axis for rotation between said fan exhaust structure and said engine cowl, so that said vanes can be rotated from a closed position which opposes forward thrust air pressure from said turbo fan to an open position whereby said vanes are parallel positioned with regards to forward thrust air direction, (d) a first arm lever mounted on said blocker vane axis and pivotally connected to said rod, (e) a second arm lever mounted on said blocker vane axis, (f) an actuator ring member substantially concentrically and rotationally mounted on said engine cowl, (g) a linkage member pivotally mounted between said actuator member and said second arm member, and (h) associated actuator means connected with said ring member for inducing rotation to said ring member whereby said linkage members actuate said second arm levers to rotate said blocker vane along said axis and said second arm lever induces motion to said rod for positioning said foils and arranged so that a closed position of said blocker vanes creates simultaneously an open position of said foils for reverse thrust position of said foils and vice versa for forward thrust.

9. A thrust reverser mechanism as claimed in claim 8 wherein said blocker vane area is unequally divided by said axis of rotation.

10. A thrust reverser mechanism as claimed in claim 8 wherein means are provided within said mechanism to provide several locking positions for required thrust quantity in reversed thrust direction.

References Cited

UNITED STATES PATENTS

| | | | |
|---|---|---|---|
| 1,714,917 | 5/1929 | Martin | 60—229 X |
| 2,945,346 | 7/1960 | Arnzen | 239—265.29 |
| 2,994,193 | 8/1961 | Friedmann | 239—265.27 |
| 2,996,881 | 8/1961 | Gardiner | 239—265.31 |
| 3,262,270 | 7/1966 | Beavers | 60—226 |
| 3,262,271 | 7/1966 | Beavers | 60—226 |

CARLTON R. CROYLE, *Primary Examiner.*